US012463002B2

(12) United States Patent
Zhang

(10) Patent No.: US 12,463,002 B2
(45) Date of Patent: Nov. 4, 2025

(54) ENERGY TUNER FOR A GATED FIELD EMISSION CATHODE DEVICE, AND ASSOCIATED METHOD

(71) Applicant: NCX Corporation, Raleigh, NC (US)

(72) Inventor: Jian Zhang, Durham, NC (US)

(73) Assignee: NCX Corporation, Raleigh, NC (US)

( * ) Notice: Subject to any disclaimer, the term of this patent is extended or adjusted under 35 U.S.C. 154(b) by 69 days.

(21) Appl. No.: 18/554,872

(22) PCT Filed: Apr. 12, 2022

(86) PCT No.: PCT/IB2022/053439
§ 371 (c)(1),
(2) Date: Oct. 11, 2023

(87) PCT Pub. No.: WO2022/219536
PCT Pub. Date: Oct. 20, 2022

(65) Prior Publication Data

US 2024/0234075 A1 Jul. 11, 2024

Related U.S. Application Data

(60) Provisional application No. 63/173,754, filed on Apr. 12, 2021.

(51) Int. Cl.
*H01J 35/06* (2006.01)
*H01J 9/18* (2006.01)
(Continued)

(52) U.S. Cl.
CPC .............. *H01J 35/065* (2013.01); *H01J 9/18* (2013.01); *H01J 35/045* (2013.01); *H01J 35/147* (2019.05)

(58) Field of Classification Search
CPC .............................. H01J 35/065; H01J 35/045
See application file for complete search history.

(56) References Cited

U.S. PATENT DOCUMENTS 4,145,635 A 3/1979 Tuck
5,070,282 A 12/1991 Epsztein
(Continued)

FOREIGN PATENT DOCUMENTS

CN 104362062 2/2015
DE 102014203334 8/2015
(Continued)

OTHER PUBLICATIONS

Sharma Anjli et al., "A carbon nanotube field-emission X-ray tube with a stationary anode target", Microelectronic Engineering, Elsevier Publishers BV., Amsterdam, NL, vol. 152, Dec. 31, 2015 (Dec. 31, 2015), p. 35-40, XP029392940.
(Continued)

*Primary Examiner* — Joseph L Williams
(74) *Attorney, Agent, or Firm* — Womble Bond Dickinson (US) LLP

(57) ABSTRACT

A field emission cathode device includes a cathode element having a field emission surface and an adjacent gate electrode element defining a first gap therebetween. A gate voltage applied to the gate electrode element causes the field emission surface to emit electrons that are accelerated through the gate electrode element. The gate electrode element is disposed between the cathode element and an anode element, the anode element having an anode voltage applied thereto to attract the electrons emitted through the gate electrode element. A tuning electrode element is disposed between the gate electrode element and the anode element. The tuning electrode element has a tuning voltage applied thereto to decelerate the electrons directed through the gate electrode element and to direct the electrons therethrough toward the anode element. An associated method of forming a field emission cathode device is also provided.

26 Claims, 7 Drawing Sheets

Figure 1A:
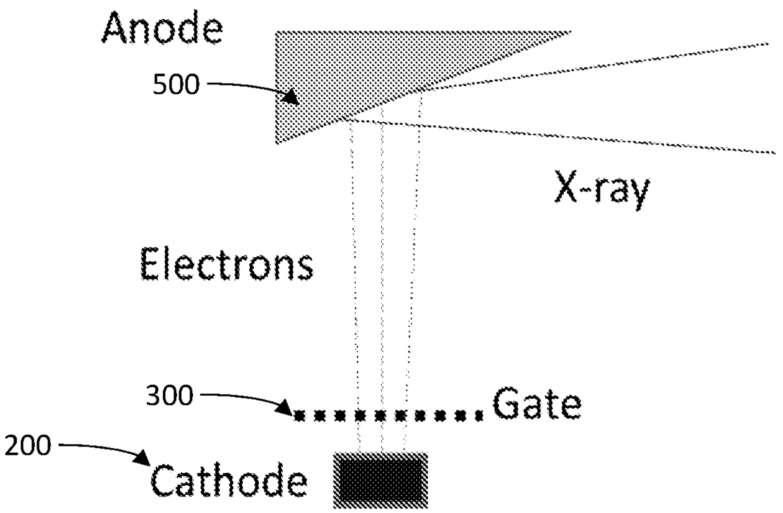
FIG. 1A Prior Art

(51) Int. Cl.
*H01J 35/04* (2006.01)
*H01J 35/14* (2006.01)

(56) References Cited

U.S. PATENT DOCUMENTS

| | | | | |
|---|---|---|---|---|
| 5,850,120 | A | 12/1998 | Okamoto | |
| 2003/0142790 | A1 | 7/2003 | Zhou et al. | |
| 2007/0090750 | A1 | 4/2007 | Lee et al. | |
| 2011/0280371 | A1 | 11/2011 | Molloi et al. | |
| 2013/0271037 | A1* | 10/2013 | Jeong | H05B 41/36 315/307 |
| 2017/0048955 | A1 | 2/2017 | Jeong et al. | |
| 2020/0227228 | A1* | 7/2020 | Jeong | H01J 35/18 |
| 2021/0305002 | A1* | 9/2021 | Kim | H01J 29/62 |

FOREIGN PATENT DOCUMENTS

| | | | |
|---|---|---|---|
| FR | 2866981 | | 9/2005 |
| JP | 2006-086001 | | 3/2006 |
| KR | 20070071918 | | 7/2007 |
| TW | 200421399 | A | 10/2004 |
| WO | 2014123701 | A1 | 8/2014 |

OTHER PUBLICATIONS

Examination Notification issued Jul. 7, 2025, in corresponding Taiwan Patent Application No. 111113851.

* cited by examiner

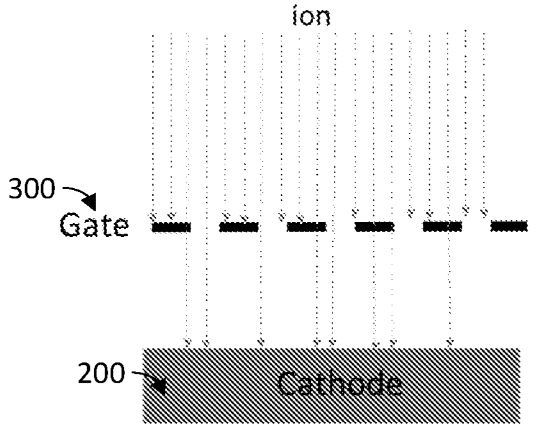

FIG. 11A

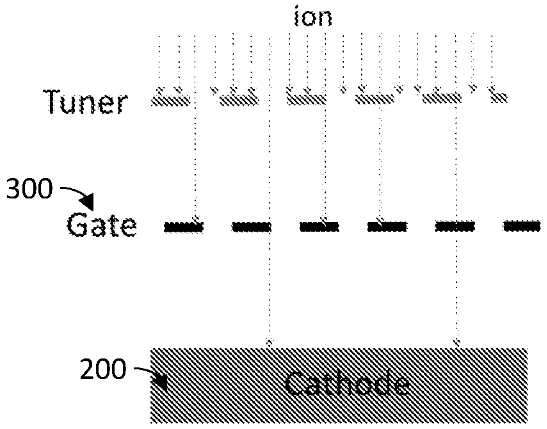

FIG. 11B

700

Arrange a gate electrode element in spaced-apart relation to a field emission surface of a cathode element electrically-connected to ground so as to define a first gap therebetween, the gate electrode element being further arranged to have a gate voltage applied thereto to form a first electric field about the gate electrode element within the first gap, the field emission surface being responsive to the first electric field to emit electrons therefrom, the emitted electrons being accelerated by the first electric field through the gate electrode element.

725

Arrange an anode element in spaced-apart relation to the cathode element, with the gate electrode element disposed therebetween, the anode element being further arranged to have an anode voltage applied thereto to form a second electric field about the anode element, the second electric field attracting the electrons emitted through the gate electrode element.

750

Arrange a tuning electrode element in spaced-apart relation to the gate electrode element, between the gate electrode element and the anode element, so as to define a second gap therebetween, the tuning electrode element being further arranged to have a tuning voltage applied thereto to form a third electric field about the tuning electrode element such that the electrons directed through the gate electrode element are decelerated by the third electric field and directed through the tuning electrode element toward the anode element.

FIG. 12

ENERGY TUNER FOR A GATED FIELD EMISSION CATHODE DEVICE, AND ASSOCIATED METHOD

CROSS-REFERENCE TO RELATED APPLICATIONS

This application is a national stage filing under 35 U.S.C. 371 of PCT/IB2022/053439, filed Apr. 12, 2022, which International Application was published by the International Bureau in English on Oct. 20, 2022, as WO 2022/219536, and application claims priority from U.S. Application No. 63/173,754, filed on Apr. 12, 2021, which applications are hereby incorporated in their entirety by reference in this application.

BACKGROUND

Field of the Disclosure

The present application relates to field emission cathode devices and, more particularly, to an energy tuner for a gated field emission cathode device and associated method for forming tunable gated field emission cathode device assembly.

Description of Related Art

A field emission X-ray tube generally includes a cathode device/assembly, having a field emission cathode disposed in a spaced-apart relation to an extraction gate structure (e.g., a gate electrode) so as to define a gap therebetween, and a corresponding anode (see, e.g., the prior art shown in FIG. 1A). The cathode includes a conductive substrate with a deposition layer of field emission material (e.g., a nanotube, a nanowire, graphene, amorphous carbon, etc.). An external gate voltage (Vg) is applied to the gate electrode, with the cathode being connected to ground, such that the generated electric field extracts field emission electrons (i.e., a field emission current) from the field emission material on the cathode surface (see, e.g., the prior art shown in FIG. 1B). Once the electrons are emitted from the field emission material, some of the electrons will pass through the opening(s) of the gate electrode, while other electrons are absorbed by the gate electrode (e.g., some emitted electrons will bombard the gate electrode). A relatively high voltage (e.g., 10 kV or more) is applied to the anode, wherein the energized anode attracts and accelerates the electrons passing through the opening(s) of the gate electrode. The subsequent collision of the accelerated electrons with the anode results in the emission of X-ray radiation.

The gate electrode in the prior art can have different forms. In some instances, the gate electrode is configured to include multiple linear bars in a grill-like structure (see, e.g., FIG. 3A). In other instances, the gate electrode is configured as a mesh-like structure (see, e.g., FIG. 3B). Moreover, the gate electrode is generally comprised of a conductive material with a high melting temperature, such as, for example, tungsten, molybdenum, stainless steel, or doped silicon. The gate electrode, whether the grill structure or the mesh structure, generally defines a physical opening portion that ranges from about 50% to about 75% open area (e.g., the area portion of the gate electrode that is open space). The physical opening portion of the gate electrode is required in order to allow the emitted electrons from the cathode surface to pass through the gate electrode so as to form an electron beam. The percentage of electrons emitted from the cathode surface and passing through the gate electrode is called the electron transmission rate, wherein the higher the transmission rate, the higher usage efficiency of the generated and emitted electrons.

With such prior art configurations of the cathode device/assembly, the energy of the electrons upon transmission through the gate electrode is determined by the gate voltage (Vg). The gate voltage generally varies from about a few hundred volts to about a few thousand volts depending, for example, on the gap distance between the cathode and the gate electrode, cathode characteristics, the magnitude of field emission current needed for the particular application, the gate electrode design, and/or other factors. In addition, the required gate voltage can change over the service life of the cathode device/assembly due to degradation of cathode performance (e.g., a higher gate voltage is required to extract the same field emission current). The increased gate voltage needed to maintain the field emission current, however, results in a corresponding variance in the energy of the emitted field emission electrons (e.g., the increased gate voltage results in an increased acceleration of the emitted electrons) which may, in turn, potentially cause various performance-related issues for the X-ray tube. For example, the focal spot size may change with the variance in the energy of the electron beam.

In addition, the required gate voltage is generally proportional to the gap distance between the cathode and the gate electrode. In order to reduce the gate voltage, a smaller gap distance is generally required. However, the smaller gap distance may cause short-circuiting issues between the cathode and the gate electrode. The gate voltage generally ranges between about a few hundred Volts and about a few thousand Volts (e.g., for high emission current applications). In instances requiring a relatively high gate voltage, the generated high energy electrons may be difficult to manipulate in regard to electron beam focus, direction of the electrons toward the anode, etc. As such, it may be desirable to decrease the energy of the emitted electrons directed through gate electrode.

Thus, there exists a need for a field emission cathode device, and a method of forming such a field emission cathode device, wherein the field emission cathode device is arranged to attenuate the energy of emitted electrons directed through the gate electrode so as to facilitate, for example, electron beam focus and transmission of the electron beam to the anode. Such energy attenuation of the emitted electrons should preferably be variable/adjustable, as needed, to compensate for changes in gate voltage due, for example, to cathode degradation.

SUMMARY OF THE DISCLOSURE

The above and other needs are met by aspects of the present disclosure which includes, without limitation, the following example embodiments and, in one particular aspect, provides a tunable field emission cathode device, including a cathode element having a field emission surface and being electrically-connected to ground. A gate electrode element is disposed in spaced-apart relation to the field emission surface of the cathode element so as to define a first gap therebetween. The gate electrode element is arranged to have a gate voltage applied thereto to form a first electric field about the gate electrode element within the first gap, with the field emission surface emitting electrons in response to the first electric field. The electrons emitted from the field emission surface are accelerated by the first electric field through the gate electrode element. An anode element is spaced apart from the cathode element, with the gate electrode element disposed therebetween. The anode element is arranged to have an anode voltage applied thereto to form a second electric field about the anode element, with the second electric field attracting the electrons emitted through the gate electrode element. A tuning electrode element is disposed in spaced-apart relation to the gate electrode element, between the gate electrode element and the anode element, so as to define a second gap therebetween. The tuning electrode element is arranged to have a tuning voltage applied thereto to form a third electric field about the tuning electrode element. The electrons directed through the gate electrode element are decelerated by the third electric field and directed through the tuning electrode element toward the anode element.

Another example aspect provides a method of forming a tunable field emission cathode device, comprises arranging a gate electrode element in spaced-apart relation to a field emission surface of a cathode element electrically-connected to ground so as to define a first gap therebetween. The gate electrode element is further arranged to have a gate voltage applied thereto to form a first electric field about the gate electrode element within the first gap, with the field emission surface being responsive to the first electric field to emit electrons therefrom. The emitted electrons are accelerated by the first electric field through the gate electrode element. An anode element is arranged in spaced-apart relation to the cathode element, with the gate electrode element disposed therebetween. The anode element is further arranged to have an anode voltage applied thereto to form a second electric field about the anode element, with the second electric field attracting the electrons emitted through the gate electrode element. A tuning electrode element is arranged in spaced-apart relation to the gate electrode element, between the gate electrode element and the anode element, so as to define a second gap therebetween. The tuning electrode element is further arranged to have a tuning voltage applied thereto to form a third electric field about the tuning electrode element such that the electrons directed through the gate electrode element are decelerated by the third electric field and directed through the tuning electrode element toward the anode element.

The present disclosure thus includes, without limitation, the following example embodiments:

Example Embodiment 1: A tunable field emission cathode device, comprising a cathode element having a field emission surface and being electrically-connected to ground; a gate electrode element disposed in spaced-apart relation to the field emission surface of the cathode element so as to define a first gap therebetween, the gate electrode element being arranged to have a gate voltage applied thereto to form a first electric field about the gate electrode element within the first gap, the field emission surface emitting electrons in response to the first electric field, the electrons emitted from the field emission surface being accelerated by the first electric field through the gate electrode element; an anode element spaced apart from the cathode element, with the gate electrode element disposed therebetween, the anode element being arranged to have an anode voltage applied thereto to form a second electric field about the anode element, the second electric field attracting the electrons emitted through the gate electrode element; and a tuning electrode element disposed in spaced-apart relation to the gate electrode element, between the gate electrode element and the anode element, so as to define a second gap therebetween, the tuning electrode element being arranged to have a tuning voltage applied thereto to form a third electric field about the tuning electrode element, the electrons directed through the gate electrode element being decelerated by the third electric field and directed through the tuning electrode element toward the anode element.

Example Embodiment 2: The device of any preceding example embodiment, or combinations thereof, wherein the gate electrode element or the tuning electrode element is comprised of a plurality of parallel grill members or has a mesh structure.

Example Embodiment 3: The device of any preceding example embodiment, or combinations thereof, wherein the plurality of parallel grill members or the mesh structure of the gate electrode element or the tuning electrode element has an open area of at least about 75%.

Example Embodiment 4: The device of any preceding example embodiment, or combinations thereof, wherein the plurality of parallel grill members or the mesh structure of the gate electrode element or the tuning electrode element has an open area, and wherein the open area of the tuning electrode element is greater than the open area of the gate electrode element.

Example Embodiment 5: The device of any preceding example embodiment, or combinations thereof, wherein the gate voltage is between about 100V and about 5 kV.

Example Embodiment 6: The device of any preceding example embodiment, or combinations thereof, wherein the gate voltage is proportional to a magnitude of the first gap.

Example Embodiment 7: The device of any preceding example embodiment, or combinations thereof, wherein the tuning voltage is less than the gate voltage.

Example Embodiment 8: The device of any preceding example embodiment, or combinations thereof, wherein the tuning voltage is variable and proportional to a velocity of the electrons directed through the tuning electrode element.

Example Embodiment 9: The device of any preceding example embodiment, or combinations thereof, wherein the anode voltage is equal to or greater than 10 kV.

Example Embodiment 10: The device of any preceding example embodiment, or combinations thereof, comprising a focusing element disposed between the tuning electrode element and the anode element, the focusing element being arranged to focus the electrons directed through the tuning electrode element on a focal spot on the anode element.

Example Embodiment 11: The device of any preceding example embodiment, or combinations thereof, wherein the cathode element comprises a conductive substrate, and wherein the field emission surface comprises a deposition layer on the conductive substrate, the deposition layer comprising nanotubes, nanowires, graphene, amorphous carbon, or combinations thereof.

Example Embodiment 12: The device of any preceding example embodiment, or combinations thereof, wherein the gate electrode element or the tuning electrode element is comprised of a conductive material having a high melting temperature.

Example Embodiment 13: The device of any preceding example embodiment, or combinations thereof, wherein the gate electrode element or the tuning electrode element is comprised of tungsten, molybdenum, stainless steel, doped silicon, or combinations thereof.

Example Embodiment 14: The device of any preceding example embodiment, or combinations thereof, wherein the gate voltage is a positive voltage and the tuning voltage is a negative voltage, and wherein the tuning voltage is variable in relation to the gate voltage to attenuate an energy and a waveform of the electrons directed through the tuning electrode element over a time period.

Example Embodiment 15: The device of any preceding example embodiment, or combinations thereof, wherein the gate voltage is a positive voltage applied to the gate electrode element to generate emitted electrons from the field emission surface over an electron emission time period, while the tuning voltage is a negative voltage selected to prevent the emitted electrons from passing through the tuning electrode element and such that the emitted electrons accumulate between the gate electrode element and the tuning electrode element, and wherein upon expiration of the electron emission time period, the tuning voltage is changed from the negative voltage to a positive voltage to accelerate the accumulated emitted electrons toward the anode element as a burst electron current pulse.

Example Embodiment 16: The device of any preceding example embodiment, or combinations thereof, wherein the tuning electrode element is arcuate and arranged to be concave relative to the anode element, so as to focus the electrons directed through the tuning electrode element on a focal spot on the anode element.

Example Embodiment 17: A method of forming a tunable field emission cathode device, comprising arranging a gate electrode element in spaced-apart relation to a field emission surface of a cathode element electrically-connected to ground so as to define a first gap therebetween, the gate electrode element being further arranged to have a gate voltage applied thereto to form a first electric field about the gate electrode element within the first gap, the field emission surface being responsive to the first electric field to emit electrons therefrom, the emitted electrons being accelerated by the first electric field through the gate electrode element; arranging an anode element in spaced-apart relation to the cathode element, with the gate electrode element disposed therebetween, the anode element being further arranged to have an anode voltage applied thereto to form a second electric field about the anode element, the second electric field attracting the electrons emitted through the gate electrode element; and arranging a tuning electrode element in spaced-apart relation to the gate electrode element, between the gate electrode element and the anode element, so as to define a second gap therebetween, the tuning electrode element being further arranged to have a tuning voltage applied thereto to form a third electric field about the tuning electrode element such that the electrons directed through the gate electrode element are decelerated by the third electric field and directed through the tuning electrode element toward the anode element.

Example Embodiment 18: The method of any preceding example embodiment, or combinations thereof, wherein arranging the gate electrode element in spaced-apart relation to the cathode element or arranging the tuning electrode element in space-apart relation to the gate electrode element comprises arranging a plurality of parallel grill members or a mesh structure, each having an open area of at least about 75%, in spaced-apart relation to the cathode element or the gate electrode element, respectively.

Example Embodiment 19: The method of any preceding example embodiment, or combinations thereof, wherein the plurality of parallel grill members or the mesh structure of the gate electrode element or the tuning electrode element has an open area, and wherein arranging the tuning electrode element comprises arranging the tuning electrode element, the tuning electrode element having an open area greater than the open area of the gate electrode element, in spaced apart relation to the gate electrode element.

Example Embodiment 20: The method of any preceding example embodiment, or combinations thereof, comprising arranging the gate electrode element such that the gate voltage applied thereto is between about 100V and about 5 kV.

Example Embodiment 21: The method of any preceding example embodiment, or combinations thereof, comprising arranging the gate electrode element such that the gate voltage applied thereto is proportional to a magnitude of the first gap.

Example Embodiment 22: The method of any preceding example embodiment, or combinations thereof, comprising arranging the tuning electrode element such that the tuning voltage applied thereto is less than the gate voltage applied to the gate electrode element.

Example Embodiment 23: The method of any preceding example embodiment, or combinations thereof, comprising arranging the tuning electrode element such that the tuning voltage applied thereto is variable and proportional to a velocity of the electrons directed through the tuning electrode element.

Example Embodiment 24: The method of any preceding example embodiment, or combinations thereof, comprising arranging the anode element such that the anode voltage is equal to or greater than 10 kV.

Example Embodiment 25: The method of any preceding example embodiment, or combinations thereof, comprising arranging a focusing element between the tuning electrode element and the anode element, the focusing element being further arranged to focus the electrons directed through the tuning electrode element on a focal spot on the anode element.

Example Embodiment 26: The method of any preceding example embodiment, or combinations thereof, comprising arranging the gate electrode element to have a positive gate voltage applied thereto, and arranging the tuning electrode element to have a negative tuning voltage applied thereto with the tuning voltage being variable in relation to the gate voltage to attenuate an energy and a waveform of the electrons directed through the tuning electrode element over a time period.

Example Embodiment 27: The method of any preceding example embodiment, or combinations thereof, comprising arranging the gate electrode element to have a positive gate voltage applied thereto to generate emitted electrons from the field emission material over an electron emission time period, arranging the tuning electrode element to have a negative tuning voltage applied thereto and selected to prevent the emitted electrons from passing through the tuning electrode element such that the emitted electrons accumulate between the gate electrode element and the tuning electrode element, and upon expiration of the electron emission time period, arranging the tuning electrode element to have a positive tuning voltage applied thereto to accelerate the accumulated emitted electrons toward the anode element as a burst electron current pulse.

Example Embodiment 28: The method of any preceding example embodiment, or combinations thereof, wherein arranging the tuning electrode element comprises arranging the tuning electrode element, the tuning electrode element being arcuate, such the that tuning electrode element is concave relative to the anode element, such that the electrons directed through the tuning electrode element are focused on a focal spot on the anode element.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 1B:
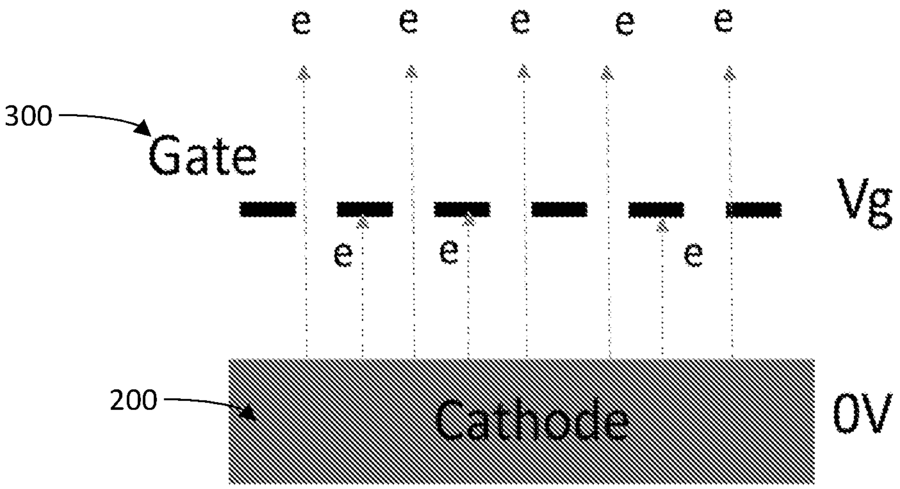
FIG. 1B Prior Art
Figure 2A:
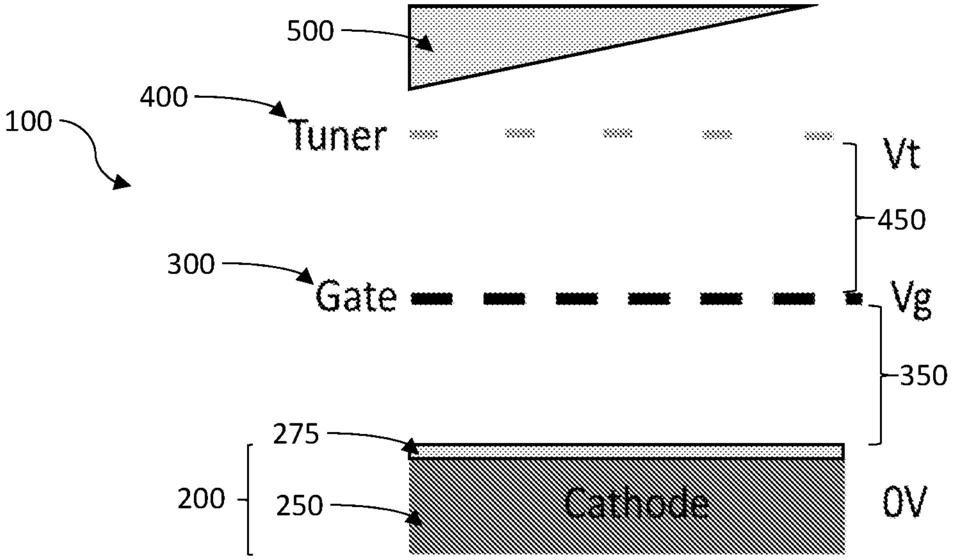
Figure 2B:
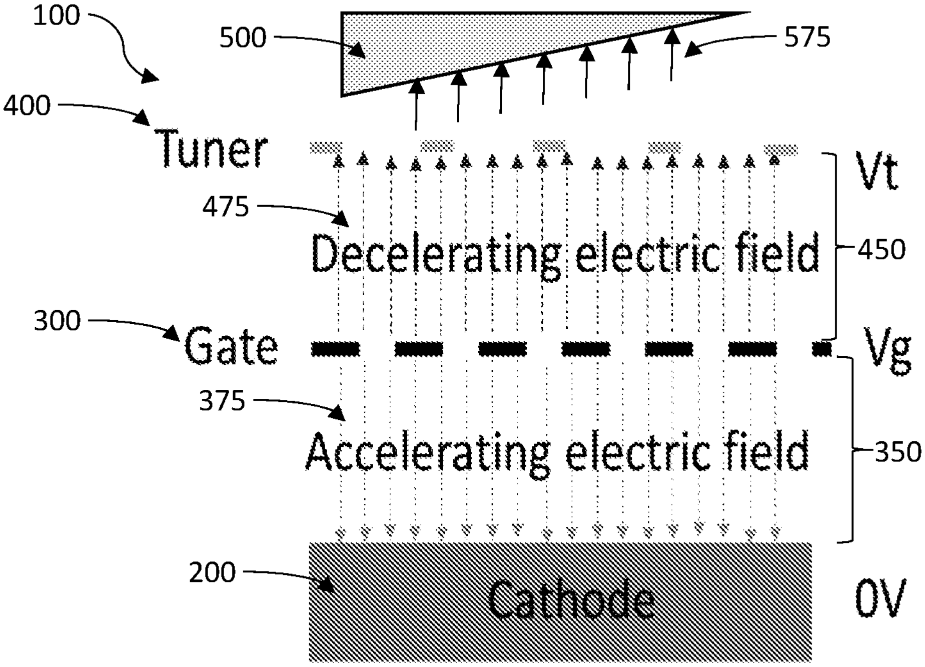
Figure 2C:
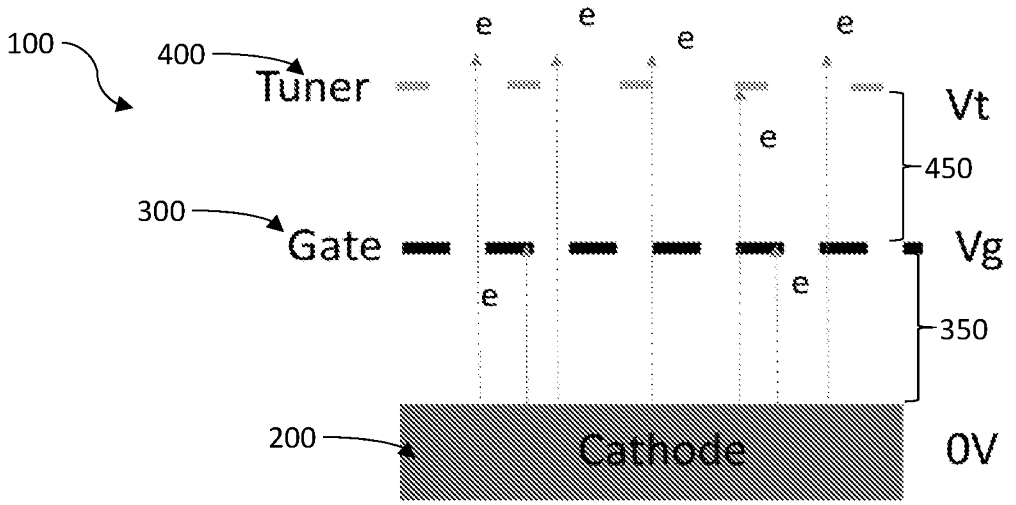
Figure 3A:
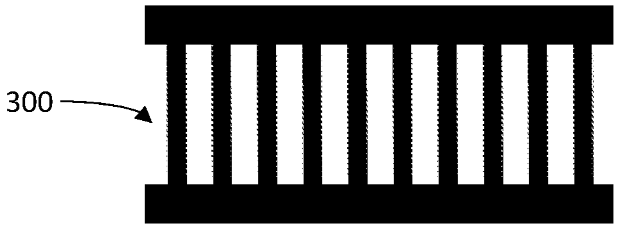
Figure 3B:
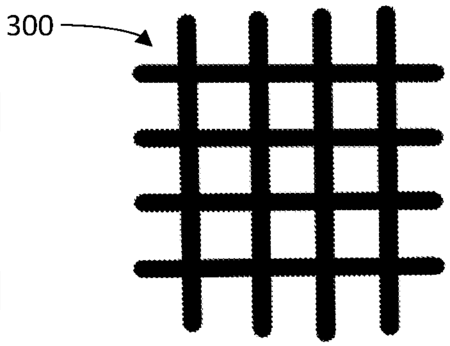
Figure 4A:
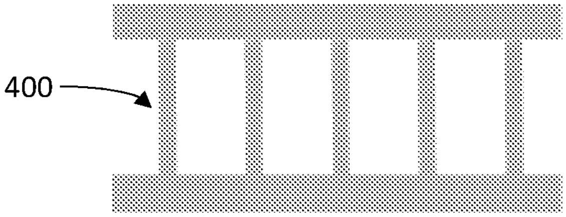
Figure 4B:
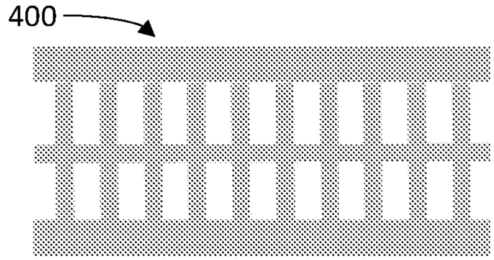
Figure 5A:
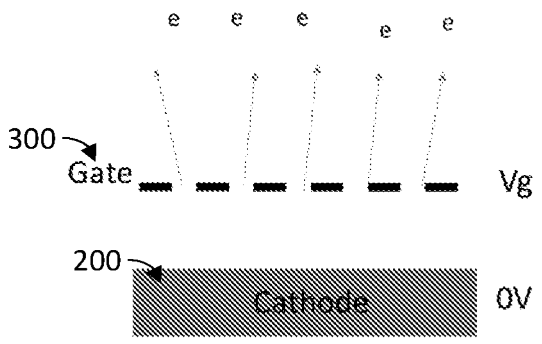
FIG. 5A Prior Art
Figure 5B:
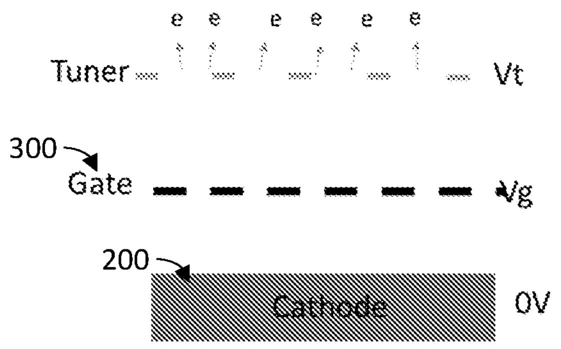
Figure 6A:
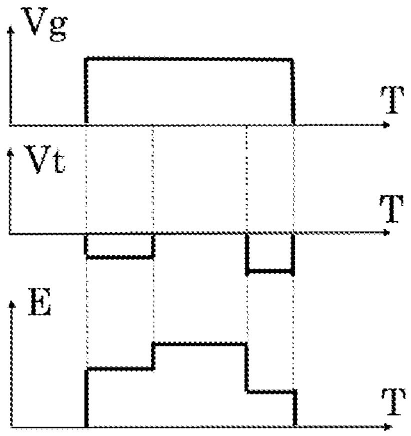
Figure 6B:
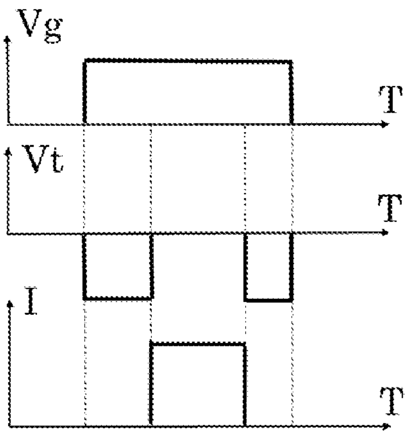
Figure 7:
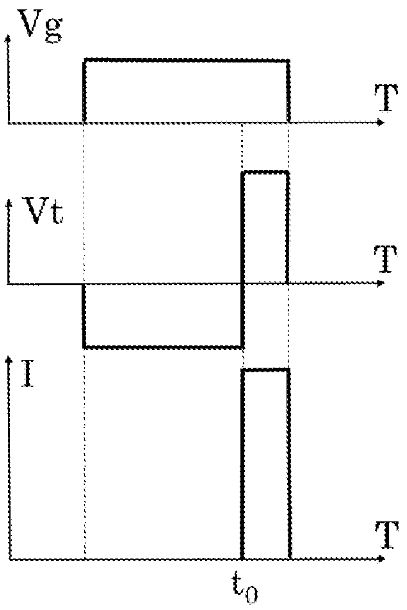
Figure 8A:
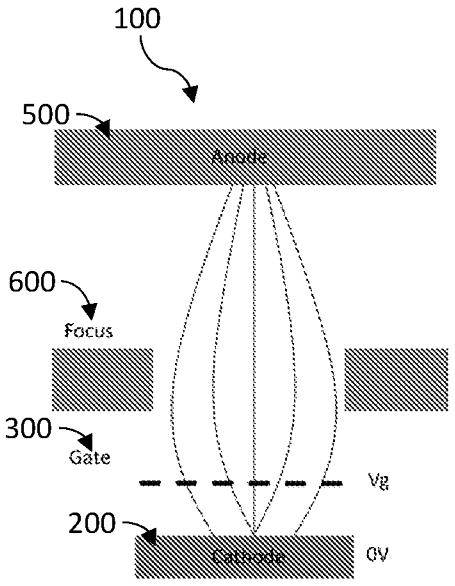
FIG. 8A Prior Art
Figure 8B:
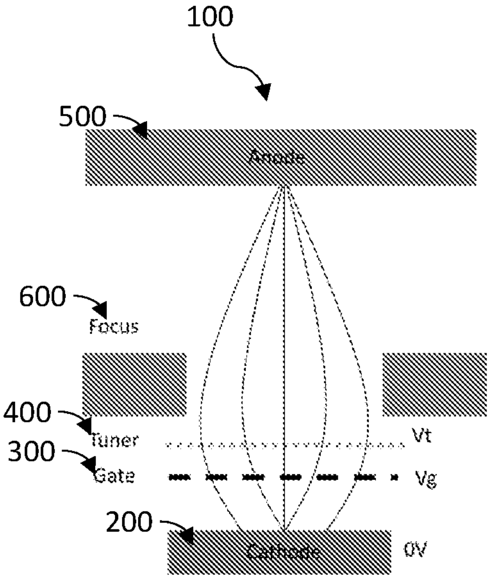
Figure 9:
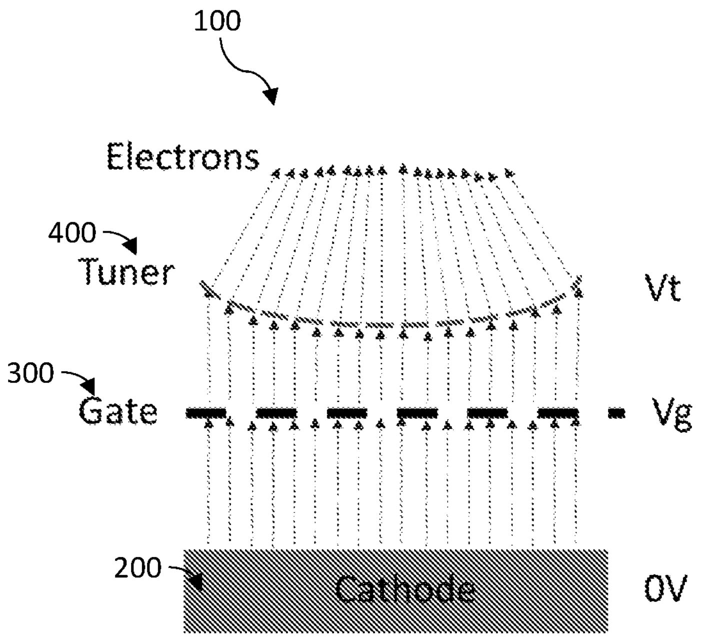
Figure 10A:
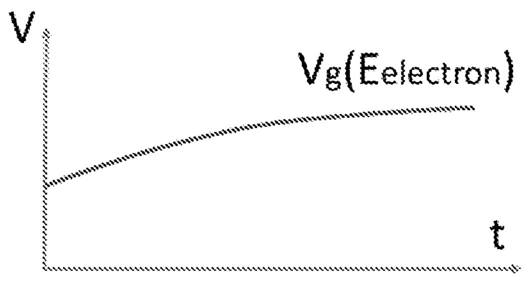
FIG. 10A Prior Art
Figure 10B:
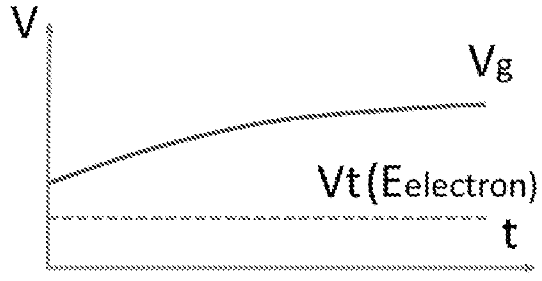

Having thus described the disclosure in general terms, reference will now be made to the accompanying drawings, which are not necessarily drawn to scale, and wherein:

FIG. 1A schematically illustrates a prior art example of an X-ray source including a field emission cathode device;

FIG. 1B schematically illustrates a prior art example of a field emission cathode device;

FIG. 2A-2C schematically illustrate a field emission cathode device implementing a tuning electrode, according to aspects of the present disclosure;

FIG. 3A schematically illustrates an example of a gate electrode for a field emission cathode device, with the gate electrode having multiple linear bars in a grill-like structure;

FIG. 3B schematically illustrates an example of a gate electrode for a field emission cathode device, with the gate electrode having a mesh-like structure;

FIG. 4A schematically illustrates a tuning electrode for a field emission cathode device, with the tuning electrode having multiple linear bars in a grill-like structure, according to one aspect of the present disclosure;

FIG. 4B schematically illustrates a tuning electrode for a field emission cathode device, with the tuning electrode having a mesh-like structure, according to one aspect of the present disclosure;

FIG. 5A schematically illustrates a prior art example of a field emission cathode device, wherein the energy of the emitted electrons is proportional to the gate voltage;

FIG. 5B schematically illustrates a field emission cathode device, according to one aspect of the present disclosure, wherein the energy of the emitted electrons is proportional to the tuning voltage;

FIG. 6A schematically illustrates a field emission cathode device, according to one aspect of the present disclosure, wherein the tuning voltage can be varied to modulate the energy of the emitted electrons;

FIG. 6B schematically illustrates a field emission cathode device, according to one aspect of the present disclosure, wherein the tuning voltage can be varied to modulate the waveform of the emitted electrons;

FIG. 7 schematically illustrates a field emission cathode device, according to one aspect of the present disclosure, wherein the tuning voltage can be manipulated to provide a burst mode of the emitted electrons;

FIG. 8A schematically illustrates a prior art example of a field emission cathode device, wherein the energy of the emitted electrons is proportional to the gate voltage applied to the gate electrode, which may lead to inefficient focus of the electron beam;

FIG. 8B schematically illustrates a field emission cathode device, according to one aspect of the present disclosure, wherein the energy of the emitted electrons is proportional to the tuning voltage applied to the tuning electrode, wherein attenuation of the energy of the electron beam facilitates improved focusing of the electron beam on the focal spot on the anode;

FIG. 9 schematically illustrates a field emission cathode device, according to one aspect of the present disclosure, wherein an arcuate tuning electrode element is arranged to focus the emitted electrons on a focal spot on the anode element;

FIG. 10A schematically illustrates a prior art example of gate voltage applied to a gate electrode in a field emission cathode device, wherein the applied gate voltage increases over time due to, for example, cathode degradation;

FIG. 10B schematically illustrates a gate voltage applied to a gate electrode in a field emission cathode device, according to one aspect of the present disclosure, wherein even though the applied gate voltage may increase over time, the energy of the emitted electrons is proportional to the tuning voltage applied to the tuning electrode;

FIG. 11A schematically illustrates a field emission cathode device without a tuning electrode element, wherein the gate electrode element and the cathode element can be susceptible to ion bombardment due to the high voltage application to the anode element;

FIG. 11B schematically illustrates a field emission cathode device, according to one aspect of the present disclosure, wherein the tuning electrode element at least partially contributes to protecting the gate electrode element and the cathode element from ion bombardment due to the high voltage application to the anode element; and FIG. 12 schematically illustrates a method of forming a tunable field emission cathode device, according to one aspect of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIGS. 2A-2C illustrate a field emission cathode device according to various aspects of the present disclosure. Such a field emission cathode device 100 generally includes a cathode element 200 comprising a substrate 250 (usually comprised of a metal or other conducting material such as stainless steel, tungsten, molybdenum, doped silicon), a layer of a field emission material 275 (e.g., a mixture of nanomaterials such as nanotubes, graphene, nanowires, amorphous carbon, etc.) disposed on the substrate 250, and, if necessary, an additional layer of an adhesion material (not shown) disposed between the substrate and the field emission material 275.

A field emission cathode device/assembly 100 generally includes a field emission cathode element 200 disposed in a spaced-apart relation to a gate electrode element 300 so as to define a (first) gap 350 therebetween. An external gate voltage (Vg) is applied to the gate electrode, with the cathode element 200 being connected to ground, such that the generated (first) electric field 375 in the first gap 350 extracts field emission electrons from the field emission material 275 on the cathode surface. Once the electrons are emitted from the field emission material 275 on the cathode surface, some of the electrons will pass through the opening(s) or open area of the gate electrode 300, while other electrons are absorbed by the gate electrode 300 (e.g., some emitted electrons will bombard the gate electrode). The gate voltage generally ranges from about a few hundred Volts to a few thousand Volts (e.g., between about 100V and about 5 kV), and the generated (first) electric field 375 generated by the gate voltage accelerates the electrons emitted by the field emission surface 275 of the cathode and directed through the gate electrode 300. In some aspects, the gate voltage is proportional to a magnitude of the (first) gap 350 between the cathode element 200 and the gate electrode 300 (e.g., the greater the gap, the greater the applied gate voltage).

The gate electrode 300, in some instances, is configured to include multiple linear bars in a grill-like structure (see, e.g., the plan view in FIG. 3A). In other instances, the gate electrode 300 is configured as a mesh-like structure (see, e.g., the plan view in FIG. 3B). Moreover, the gate electrode 300 is generally comprised of a conductive material with a high melting temperature, such as, for example, tungsten, molybdenum, stainless steel, or doped silicon. In some aspects, the gate electrode element 300, whether having the plurality of parallel grill members or the mesh structure, has an open area of at least about 75%. That is, for a given area of the gate electrode element 300, at least about 75% of that area is open space, with the parallel grill members or the mesh structure occupying the remaining area (e.g., no more than about 25%). The open area of at least about 75% allows for a relatively high gate transmission rate of the gate electrode element 300 (e.g., the relatively high open area provides more opportunity for more of the emitted electrons to pass therethrough instead of bombarding the parallel grill members or the mesh structure). In other aspects, the gate electrode element 300 has an open area of more than about 80%.

In practical applications of a field emission cathode device 100 such as, for example, an X-ray tube/source, an anode element 500 is disposed in spaced-apart relation to the cathode device/assembly 100, such that the gate electrode 300 is disposed between the cathode 200 and the anode 500 (see, e.g., FIG. 1A). The anode 500 is arranged to have an anode voltage (e.g., greater than or equal to about 10 kV) applied thereto to form a (second) electric field 575 (see, e.g., FIG. 2B) about the anode element 500. The (second) electric field 575 generated by the anode 500 attracts the emitted electrons directed through the gate electrode element 300.

According to particular aspects of the present disclosure, a tuning electrode element 400 (see, e.g., FIGS. 2A-2C, 5B, 8B) is disposed in spaced-apart relation to the gate electrode 300, between the gate electrode 300 and the anode 500, so as to define a (second) gap therebetween 450. The tuning electrode element 400 is arranged to have a tuning voltage applied thereto to form a (third) electric field 475 about the tuning electrode 400. The electrons directed through the gate electrode 300 are decelerated by the (third) electric field 475 generated by the tuning electrode element 400, while the electrons are directed through the tuning electrode element 400 toward the anode 500.

That is, according to aspects of the present disclosure, an additional electrode (e.g., tuning electrode element 400) is added to the cathode device/assembly 100. The tuning electrode element 400 has a different voltage (Vt) applied thereto, wherein the tuning voltage is generally, but not necessarily, lower than the gate voltage (Vg). One effect of the tuning electrode element 400 is to implement an additional electric field 475 effecting the emitted electrons. The electric field 375 generated by the gate voltage is an accelerating electric field between the cathode 200 and the gate electrode element 300, while the electric field 475 generated by the tuning voltage is a decelerating electric field between the gate electrode element 300 and the tuning electrode element 400 (see, e.g., FIG. 2B). As such, the electrons extracted from the cathode 200 by the electric field 375 generated by the gate electrode element 300 will be accelerated by the gate voltage (Vg) and then pass through the gate electrode element 300. After passing through the gate electrode element 300, those electrons will be decelerated by the electric field 475 generated by tuning electrode element 400, between the gate electrode element 300 and the tuning electrode element 400.

The tuning electrode element 400, in some instances, is configured to include multiple linear bars in a grill-like structure (see, e.g., the plan view in FIG. 4A). In other instances, the tuning electrode element 400 is configured as a mesh-like structure (see, e.g., the plan view in FIG. 4B). Moreover, the tuning electrode element 400 is generally comprised of a conductive material with a high melting temperature, such as, for example, tungsten, molybdenum, stainless steel, or doped silicon. In some aspects, the tuning electrode element 400, whether having the plurality of parallel grill members or the mesh structure, has an open area of at least about 75%. In other aspects, the tuning electrode element 400 has an open area greater than the open area of the gate electrode element 300. Generally, increased open area of the tuning electrode element 400 results in a higher electron transmission rate through the tuning electrode element 400.

That is, in some aspects, the tuning voltage is selected (e.g., such that the tuning voltage is greater than the ground voltage, Vt>0, and generally though not necessarily less than the gate voltage Vg depending on the particular application) so that the electrons will have sufficient energy to pass through the tuning electrode element 400. In such aspects, the tuning electrode element 400 has a relatively high open area (e.g., greater than about 75% and/or greater than the open area of the gate electrode) to allow a larger amount of the electrons to pass therethrough (see, e.g., FIGS. 2B and 2C). The electrons transmitted through the tuning electrode element 400 will thus have a lower velocity (e.g., lower kinetic energy) if Vt<Vg, which may facilitate improved focus of the electron beam on the focal spot on the anode 500. In some instances, a focusing element 600 (see, e.g., FIGS. 8A and 8B) is disposed between the tuning electrode element 400 and the anode 500, wherein the focusing element 600 is arranged to facilitate focusing of the electrons directed through the tuning electrode element 400 on a focal spot on the anode 500 (see, e.g., FIG. 8B).

In some aspects, the energy of the electrons passed through the tuning electrode element 400 is also tunable by selectively choosing the tuning voltage (Vt) applied to the tuning electrode element 400. That is, the tuning voltage is variable and the magnitude of the applied tuning voltage may be proportional to the velocity of the electrons directed through the tuning electrode element 400 (e.g., the greater the applied tuning voltage, the greater the velocity (e.g., kinetic energy) of the electrons passing through the tuning electrode element 400). The energy associated with the electrons or electron beam directed to the anode 500 is thus defined by the tuning voltage (Vt) (see, e.g., FIG. 5B) instead of by the gate voltage (Vg) (see, e.g., FIG. 5A).

In other aspects, the waveform of the electrons emitted from the field emission material 275 on the cathode surface 250 is generally determined by the gate voltage applied to the gate electrode element 300. The implementation of the tuning electrode element 400 provides an additional manner of controlling/determining the waveform of emitted electrons, as well as the energy of the emitted electrons. For example, as shown in FIG. 6A, a particular combination of gate voltage (Vg—positive voltage) and tuning voltage (Vt—negative voltage) can modulate the energy (E) of the emitted electrons over a particular time period (T). In some instances, if the tuning voltage is a particular negative voltage (e.g., a high magnitude of negative voltage), the field generated about the tuning electrode element 400 (e.g., the third electric field 475) can prevent the emitted electrons (e.g., the emission current) from reaching the anode 500. As a result, as shown for example in FIG. 6B, the waveform of the emitted electrons can also be modulated as necessary or desired. That is, in particular aspects, the gate voltage applied to the gate electrode element 300 is a positive voltage and the tuning voltage applied to the tuning electrode element 400 is a negative voltage, wherein the tuning voltage is variable in relation to the gate voltage to attenuate an energy and a waveform of the emitted electrons directed through the tuning electrode element 400 over a time period.

In still other aspects, the implementation of the tuning electrode element 400 may also permit modulation of the emitted electrons in a burst mode. For example, as shown in FIG. 7, a particular gate voltage (Vg) is applied to the gate electrode element 300 to generate electrons emitted from the field emission material 275 on the cathode surface 250 over a particular electron emission time period. The tuning voltage (Vt) is then arranged with respect to the application of the gate voltage, wherein the tuning voltage is initially applied to the tuning electrode element 400 at a particular magnitude of negative voltage to prevent the emitted electrons from being directed to the anode 500. The emitted electrons will thus be accumulated between the gate electrode element 300 and tuning electrode element 400 to form an electron cloud (e.g., space charge). After a particular time period (e.g., an electron emission time period t0) during which the emitted electrons are accumulated, the tuning voltage is changed from the initial negative voltage to a relatively high positive voltage. The accumulated space charge will then be accelerated toward the anode 500 by the tuning electrode element 400, and will thus form a relatively high electron current pulse. Since the accumulated space charge in the relatively short pulse can represent emitted electrons that have been accumulated over relative long period of time, the burst mode can provide a relatively high electron current pulse to the anode 500. That is, in particular aspects, the gate voltage is a positive voltage applied to the gate electrode element 300 to generate emitted electrons over an electron emission time period, while the tuning voltage is a negative voltage selected to prevent the emitted electrons from passing through the tuning electrode element 400 and such that the emitted electrons accumulate between the gate electrode element 300 and the tuning electrode element 400. Upon expiration of the electron emission time period, the tuning voltage is changed from the negative voltage to a positive voltage to accelerate the accumulated emitted electrons toward the anode element 500 as a burst electron current pulse.

With reduced energy associated with the electrons/electron beam, the electron beam is more readily manipulated in regard to, for example, focusing on the anode 500. That is, as shown in FIG. 8A, a prior art cathode device/assembly 100 implementing only a gate electrode element 300 provides a high energy electron beam as defined by the gate voltage (Vg). However, the high energy electron beam is generally difficult to focus on the anode 500, and a large focal spot is generally not preferred for imaging application. With a tuning electrode element 400 implemented as disclosed herein (see, e.g., FIG. 8B), the emitted electrons are better controlled and generally form a lower energy electron beam as associated with the tuning voltage (Vt). The relatively lower-energy electron beam is generally more readily manipulated (e.g., focusing) to achieve a small focal spot on the anode 500, as generally preferred, for example, for high resolution imaging applications.

In other aspects, the tuning electrode element 400 itself can provide electron beam focusing. As shown, for example, in FIG. 9, an arcuate/curved tuning electrode element 400 can be implemented, wherein the electric field (e.g., the third electric field 475) generated by application of the tuning voltage to the curved tuning electrode element 400 directs the emitted electrons in a convergent manner so as to focus the emitted electrons into an electron beam with a desired electron beam profile, as necessary or desired, such that the electron beam interacts with the anode 500 at a particular focal spot.

Should the gate voltage Vg need to be increased over a period of time due to, for example, cathode degradation, the electron/electron beam energy as determined only by the gate voltage will also increase (see, e.g., FIG. 10A), which is generally not preferred for desirable X-ray tube performance due to, for example, a negative impact on electron beam focal spot size, electron transmission rate, gate electrode lifetime, etc. By implementing the tuner electrode/arrangement disclosed herein, the energy associated with the emitted electron beam is determined by the tuning voltage (Vt), even in the event of a change in the gate voltage (Vg).

During an X-ray tube operation, both the cathode and the gate electrode are each directly exposed to a high voltage environment (e.g., as high as a few hundred kilovolts), and may thus be susceptible to high voltage arcing and/or ion bombardment induced by high voltage applied to the anode (see, e.g., FIG. 11A). The implementation of the (additional) tuning electrode element may provide at least some protection for the gate electrode and/or the cathode by preventing at least some of the incoming high voltage arcing and ion particles from contacting and/or damaging the gate electrode and/or cathode (see, e.g., FIG. 11B). Accordingly, the implementation of the tuning electrode element may facilitate extension of the service life of a cathode.

Further, high voltage applied to the anode may penetrate through the openings of a single gate electrode and increase the electric field causing electron emission from the field emission cathode. If the gate electrode is not dense enough and/or the voltage applied to the anode is high enough, additional dark electron current may be induced from the field emission cathode. The undesired dark electron current can possibly cause excessive radiation dosage emitted by the X-ray tube, degrade imaging quality, and/or overheat the X-ray tube. Implementation of a tuning electrode element may facilitate reduction of the electric field penetration of the gate electrode due to the high voltage applied to the anode, and may thus reduce or eliminate the generation of dark electron current.

Also, when a single gate electrode is used to generate the field emission current, the grid/mesh structure of the gate electrode may cause non-uniformity of the emitted electrons. In other instances, hot spots (locations with high electron emission density) may occur in the electron emission current due to the variation in the electron emitter density of the field emission material on the cathode surface and/or an uneven/non-uniform gap between the gate electrode element and the cathode. By implementing the (additional) tuning electrode element, deflection and/or mixing of the as-generated electron beam may occur and the uniformity of electron emission current may increase as a result.

Aspects of the present disclosure thus allow a desired electron emission current from the cathode to be maintained, for example, even if the gate voltage must be increased to compensate for cathode degradation. The tuning voltage applied to the tuning electrode can be adjusted to decelerate the emitted electrons (e.g., lower the velocity or kinetic energy) passed through the gate electrode. As a result, the electron emission current is maintained, while the electron velocity/acceleration due to the increased gate voltage is reduced (e.g., relatively high electron emission current with relatively lower electron velocity/energy), to provide an electron beam that may be more readily focused on the focal spot on the anode. Aspects of the present disclosure thus provide a tunable field emission cathode device, and a method of forming such a tunable field emission cathode device, wherein the field emission cathode device is arranged to attenuate the energy of emitted electrons directed through the gate electrode so as to facilitate, for example, electron beam focus and transmission of the electron beam to the anode, and wherein the energy attenuation of the emitted electrons is variable/adjustable, as needed, to compensate for changes in gate voltage due, for example, to cathode degradation.

Many modifications and other embodiments of the inventions set forth herein will come to mind to one skilled in the art to which these disclosed embodiments pertain having the benefit of the teachings presented in the foregoing descriptions and the associated drawings. For example, FIG. 12 schematically illustrates a method of forming a tunable field emission cathode device. Such a method comprises arranging a gate electrode element in spaced-apart relation to a field emission surface of a cathode element electrically-connected to ground so as to define a first gap therebetween, wherein the gate electrode element is further arranged to have a gate voltage applied thereto to form a first electric field about the gate electrode element within the first gap, wherein the field emission surface is responsive to the first electric field to emit electrons therefrom, and wherein the emitted electrons are accelerated by the first electric field through the gate electrode element (Block 700). An anode element is arranged in spaced-apart relation to the cathode element, with the gate electrode element disposed therebetween, wherein the anode element is further arranged to have an anode voltage applied thereto to form a second electric field about the anode element, the second electric field attracting the electrons emitted through the gate electrode element (Block 725). A tuning electrode element is arranged in spaced-apart relation to the gate electrode element, between the gate electrode element and the anode element, so as to define a second gap therebetween, wherein the tuning electrode element is further arranged to have a tuning voltage applied thereto to form a third electric field about the tuning electrode element such that the electrons directed through the gate electrode element are decelerated by the third electric field and directed through the tuning electrode element toward the anode element (Block 750).

Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A tunable field emission cathode device, comprising:

a cathode element having a field emission surface and being electrically-connected to ground;

a gate electrode element disposed in spaced-apart relation to the field emission surface of the cathode element so as to define a first gap therebetween, the gate electrode element being arranged to have a gate voltage applied thereto by a gate voltage source to form a first electric field about the gate electrode element within the first gap, the field emission surface emitting electrons in response to the first electric field, the electrons emitted from the field emission surface being accelerated by the first electric field through the gate electrode element;

an anode element spaced apart from the cathode element, with the gate electrode element disposed therebetween, the anode element being arranged to have an anode voltage applied thereto by an anode voltage source to form a second electric field about the anode element, the second electric field attracting the electrons emitted through the gate electrode element; and a tuning electrode element disposed in spaced-apart relation to the gate electrode element, between the gate electrode element and the anode element, so as to define a second gap therebetween, the tuning electrode element being arranged to have a tuning voltage applied thereto by a tuning voltage source to form a third electric field about the tuning electrode element, the electrons directed through the gate electrode element being decelerated by the third electric field and directed through the tuning electrode element toward the anode element, wherein the gate voltage source is configured to apply a positive voltage to the gate electrode element and the tuning voltage source is configured to apply a negative voltage to the tuning electrode element, and wherein the tuning voltage applied by the tuning voltage source is variable in relation to the gate voltage applied by the gate voltage source to attenuate an energy and a waveform of the electrons directed through the tuning electrode element over a time period.

2. The device of claim 1, wherein the gate electrode element or the tuning electrode element is comprised of a plurality of parallel grill members or has a mesh structure.

3. The device of claim 2, wherein the plurality of parallel grill members or the mesh structure of the gate electrode element or the tuning electrode element has an open area of at least about 75%.

4. The device of claim 2, wherein the plurality of parallel grill members or the mesh structure of the gate electrode element or the tuning electrode element has an open area, and wherein the open area of the tuning electrode element is greater than the open area of the gate electrode element.

5. The device of claim 1, wherein the gate voltage is between about 100V and about 5 kV.

6. The device of claim 1, wherein the gate voltage is proportional to a magnitude of the first gap.

7. The device of claim 1, wherein the tuning voltage is less than the gate voltage.

8. The device of claim 1, wherein the tuning voltage is variable and proportional to a velocity of the electrons directed through the tuning electrode element.

9. The device of claim 1, wherein the anode voltage is equal to or greater than 10 kV.

10. The device of claim 1, comprising a focusing element disposed between the tuning electrode element and the anode element, the focusing element being arranged to focus the electrons directed through the tuning electrode element on a focal spot on the anode element.

11. The device of claim 1, wherein the cathode element comprises a conductive substrate, and wherein the field emission surface comprises a deposition layer on the conductive substrate, the deposition layer comprising nanotubes, nanowires, graphene, amorphous carbon, or combinations thereof.

12. The device of claim 1, wherein the gate electrode element or the tuning electrode element is comprised of a conductive material having a high melting temperature.

13. The device of claim 1, wherein the gate electrode element or the tuning electrode element is comprised of tungsten, molybdenum, stainless steel, doped silicon, or combinations thereof.

14. The device of claim 1, wherein the positive voltage is applied to the gate electrode element to generate emitted electrons from the field emission surface over an electron emission time period, while the negative voltage applied to the tuning electrode element is selected to prevent the emitted electrons from passing through the tuning electrode element and such that the emitted electrons accumulate between the gate electrode element and the tuning electrode element, and wherein upon expiration of the electron emission time period, the tuning voltage applied by the tuning voltage source is changed from the negative voltage to a positive voltage to accelerate the accumulated emitted electrons toward the anode element as a burst electron current pulse.

15. The device of claim 1, wherein the tuning electrode element is arcuate and arranged to be concave relative to the anode element, so as to focus the electrons directed through the tuning electrode element on a focal spot on the anode element.

16. A method of forming a tunable field emission cathode device, comprising:

arranging a gate electrode element in spaced-apart relation to a field emission surface of a cathode element electrically-connected to ground so as to define a first gap therebetween, the gate electrode element being further arranged to have a gate voltage applied thereto by a gate voltage source to form a first electric field about the gate electrode element within the first gap, the field emission surface being responsive to the first electric field to emit electrons therefrom, the emitted electrons being accelerated by the first electric field through the gate electrode element;

arranging an anode element in spaced-apart relation to the cathode element, with the gate electrode element disposed therebetween, the anode element being further arranged to have an anode voltage applied thereto by an anode voltage source to form a second electric field about the anode element, the second electric field attracting the electrons emitted through the gate electrode element;

arranging a tuning electrode element in spaced-apart relation to the gate electrode element, between the gate electrode element and the anode element, so as to define a second gap therebetween, the tuning electrode element being further arranged to have a tuning voltage applied thereto by a tuning voltage source to form a third electric field about the tuning electrode element such that the electrons directed through the gate electrode element are decelerated by the third electric field and directed through the tuning electrode element toward the anode element; and arranging the gate voltage source to apply a positive gate voltage to the gate electrode element, and arranging the tuning voltage source to apply a negative tuning voltage to the tuning electrode element, with the tuning voltage applied by the tuning voltage source being variable in relation to the gate voltage applied by the gate voltage source to attenuate an energy and a waveform of the electrons directed through the tuning electrode element over a time period.

17. The method of claim 16, wherein arranging the gate electrode element in spaced-apart relation to the cathode element or arranging the tuning electrode element in space-apart relation to the gate electrode element comprises arranging a plurality of parallel grill members or a mesh structure, each having an open area of at least about 75%, in spaced-apart relation to the cathode element or the gate electrode element, respectively.

18. The method of claim 17, wherein the plurality of parallel grill members or the mesh structure of the gate electrode element or the tuning electrode element has an open area, and wherein arranging the tuning electrode element comprises arranging the tuning electrode element, the tuning electrode element having an open area greater than the open area of the gate electrode element, in spaced apart relation to the gate electrode element.

19. The method of claim 16, comprising arranging the gate electrode element such that the gate voltage applied thereto is between about 100V and about 5 kV.

20. The method of claim 16, comprising arranging the gate electrode element such that the gate voltage applied thereto is proportional to a magnitude of the first gap.

21. The method of claim 16, comprising arranging the tuning electrode element such that the tuning voltage applied thereto is less than the gate voltage applied to the gate electrode element.

22. The method of claim 16, comprising arranging the tuning electrode element such that the tuning voltage applied thereto is variable and proportional to a velocity of the electrons directed through the tuning electrode element.

23. The method of claim 16, comprising arranging the anode element such that the anode voltage is equal to or greater than 10 kV.

24. The method of claim 16, comprising arranging a focusing element between the tuning electrode element and the anode element, the focusing element being further arranged to focus the electrons directed through the tuning electrode element on a focal spot on the anode element.

25. The method of claim 16, wherein arranging the gate electrode element to have the positive gate voltage applied thereto generates emitted electrons from the field emission material over an electron emission time period, wherein arranging the tuning electrode element to have the negative tuning voltage applied thereto includes selecting the negative tuning voltage to prevent the emitted electrons from passing through the tuning electrode element such that the emitted electrons accumulate between the gate electrode element and the tuning electrode element, and wherein upon expiration of the electron emission time period, arranging the tuning voltage source to apply a positive tuning voltage to the tuning electrode element accelerates the accumulated emitted electrons toward the anode element as a burst electron current pulse.

26. The method of claim 16, wherein arranging the tuning electrode element comprises arranging the tuning electrode element, the tuning electrode element being arcuate, such the that tuning electrode element is concave relative to the anode element, such that the electrons directed through the tuning electrode element are focused on a focal spot on the anode element.

* * * * *